Patented Oct. 18, 1932

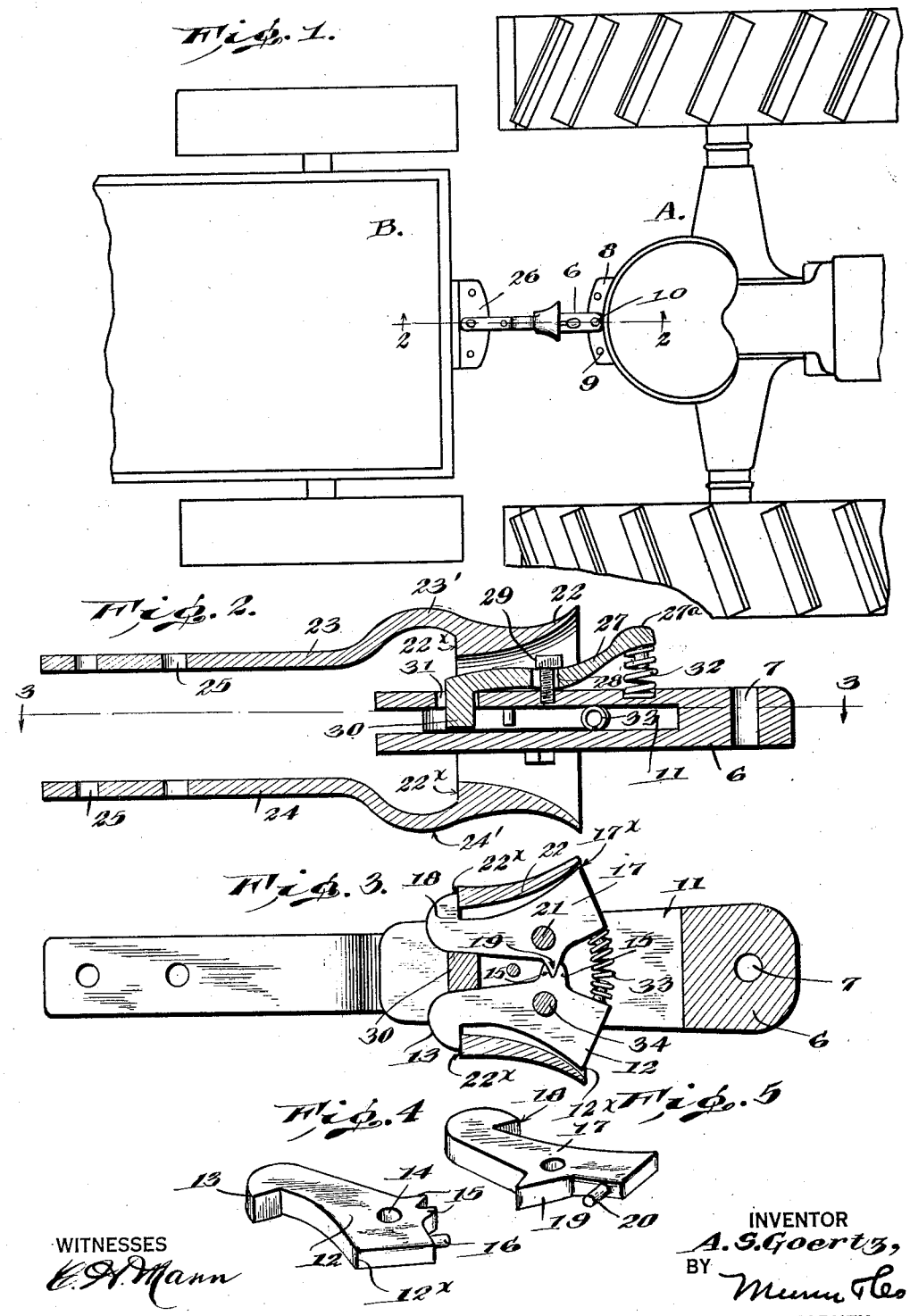

1,883,696

UNITED STATES PATENT OFFICE

ABRAHAM S. GOERTZ, OF REEDLEY, CALIFORNIA

COUPLER

Application filed May 13, 1931. Serial No. 537,109.

My invention relates to improvements in couplers such as those used on trailers and it consists in the combinations, constructions and arrangements herein described and claimed.

An object of my invention is to provide a coupler which is of relatively simple construction but which will act immediately on the engagement of a draw bar with the tongue of the trailer to automatically connect the draw bar with the tongue and to lock it in its connected position.

A further object of the invention is to provide a coupling device which may be instantly released by a comparatively slight pressure on a releasing mechanism.

A further object of the invention is to provide a device of the type described in which the coupling device will permit a rotary movement of the draw bar with respect to the tongue about the central axis of the coupling device and will also permit movements within limits at right angles thereto, thus constituting in effect a universal joint.

A further object of the invention is to provide a device in which the main operating parts are protected from injury by being disposed in a slot in the draw bar.

Other objects and advantages will appear in the following specification and the novel features of the invention will be particularly pointed out in the appended claims.

My invention is illustrated in the accompanying drawing forming part of this application, in which:

Figure 1 is a plan view showing a tractor attached to a trailer by my improved coupler, Figure 2 is an enlarged sectional view on the line 2—2 of Figure 1, Figure 3 is a sectional view on the line 3—3 of Figure 2, and Figures 4 and 5 are perspective views of the cam operated locking and attaching members.

Referring now to the drawing I have shown a tractor which is indicated in general at A and a trailer at B. The draw bar 6 of the tractor is provided with the usual opening or bore 7 for attachment to the tractor. In the present instance the draw bar is shown as being attached to a plate 8 having openings 9 for receiving the pin 10. The means for attaching the draw bar, however, forms no part of the present invention.

The draw bar is provided with a slot 11 extending from the end opposite the bore 7. Within this slot are disposed the cam operated attaching and locking members shown in Figures 4 and 5. In Figure 4 the member 12 is shown as being provided with a hook 13. An opening 14 is disposed in the body portion for pivotally mounting the member 12 on the bolt or pin 34, see Figure 3. The member 12 is provided with two teeth 15 and is also provided with a pin 16.

A companion member 17 has a hooked portion 18 conforming to the hooked portion 13 and is provided with a tooth 19 and also a pin 20. As will be seen from Figure 3 the member 17 is pivotally mounted on a pin or bolt 21 which passes through the body of the draw bar.

The tongue member is provided with a bell-shaped socket 22 having an annular bearing surface 22x at the rear thereof and being provided with integral strips 23 and 24 extending therefrom, these strips being bowed at 23' and 24' to permit the free action of the locking members as will be hereinafter explained. Openings 25 are provided in the strips 23 and 24 for attachment to a plate, such as that shown at 26 in Figure 1, or to any other ordinary tongue member, not shown.

Referring now to Figure 2, I have shown therein a locking and releasing member which consists of a lever 27. This lever is provided with an opening 28 and is held in position by means of a screw stud 29 which passes through the opening and is secured in the upper portion of the draw bar. The lever 27 has a right angled bend to constitute a finger 30 which extends through an opening 31 in the upper portion of the draw bar. The finger 30 is normally forced into the opening by means of a spring 32 which is disposed between the opposite end of the lever and the draw bar. A spring 33 is disposed between the pivoted members 12 and 17 so as to tend to force the hooked portions 13 and 18 toward one another.

From the foregoing description of the various parts of the device, the operation thereof may be readily understood. When the draw bar is free from the socket the hooked ends 13 and 18 will be together. Now when the drawing vehicle, such as a tractor, is backed against the trailer and the draw bar 6 is guided into the bell-shaped socket, the edge 12x of the member 12 and the edge 17x of the member 17 will engage the interior curved surface of the socket and will force the hooked portions 13 and 18 apart against the tension of the spring 33. The tension of the spring 32 will force the finger 30 in between the hooked portions 13 and 18 when the latter have spread apart to permit entrance of the finger. This will occur when the hooked portions 13 and 18 have cleared the rear end of the socket and engage the annular bearing surface 22x. It will be understood that this action occurs in one rearward movement of the draw bar. The draw bar is now connected to the socket by the engagement of the hooks 13 and 18 and as stated the latter are locked in position by the finger 30.

Now when it is desired to release the draw bar all that is necessary is to press downwardly on the head 27a of the lever 27. The lever as is shown is curved and the spring pressing on the head will hold it above the surface of the draw bar. The screw 29 of course can be regulated to permit the lever to be held at any distance above the draw bar. On pressing the head 27a the lever will pivot on the upper faces of the draw bar as a fulcrum and will withdraw the finger far enough to permit the spring 33 to force the hooks 13 and 18 together, thus clearing the rear edges of the socket 22 and permitting the draw bar to be withdrawn from the socket.

In a construction of this kind the draw bar and the tongue member having the socket are locked with respect to one another so as to form a swivel connection. In addition to this, however, the draw bar may have a movement at right angles to the plane of its upper and lower surfaces, thus having the benefits of a universal joint to permit the joint to give, due to the inequalities in the surface over which the tractor or trailer is passing.

The fact that the release is spring-operated makes it an instant release and the fact that the hooked members 13 and 18 are brought into engaging position by one movement and then instantly locked by a spring action makes attachment automatic and instantaneous.

I claim:

1. In a coupling, a draw bar having a slot, a pair of pivoted hooks disposed in said slot, a spring disposed between the portions of said hooks for forcing the hooks together, a socket having a portion arranged to engage a portion of said hooks for forcing said hooks apart, said socket being provided with a bearing portion behind which the hooks are adapted to enter, and spring-pressed means adapted to enter between the hooks for locking them in their engaging positions.

2. In a coupling, a draw bar, a pair of outwardly turned hooks pivotally mounted on said draw-bar, and having outwardly diverging rear ends, a spring disposed between said outwardly diverging ends for normally forcing them apart, a bell-shaped socket arranged to be engaged by said diverging ends for forcing the hooks apart, said socket having a bearing surface for engagement with said hooks.

3. In a coupling, a draw bar, a pair of outwardly turned hooks pivotally mounted on said draw bar, and having outwardly diverging rear ends, a spring disposed between said outwardly diverging ends for normally forcing them apart, a bell-shaped socket arranged to be engaged by said diverging ends for forcing the hooks apart, said socket having a bearing surface for engagement with said hooks, and a spring pressed finger adapted to project between the hooks in their engaging position.

ABRAHAM S. GOERTZ.